United States Patent [19]
Hoffa

[11] Patent Number: 5,303,542
[45] Date of Patent: Apr. 19, 1994

[54] FUEL SUPPLY CONTROL METHOD FOR A GAS TURBINE ENGINE

[75] Inventor: Robert J. Hoffa, Fairfield, Ohio

[73] Assignee: General Electric Company, Cincinnati, Ohio

[21] Appl. No.: 976,876

[22] Filed: Nov. 16, 1992

[51] Int. Cl.$^5$ .............................................. F02C 9/26
[52] U.S. Cl. ..................................... 60/39.06; 60/746
[58] Field of Search ................... 60/39.06, 734, 739, 60/746, 747

[56] References Cited

U.S. PATENT DOCUMENTS

| | | | |
|---|---|---|---|
| 2,833,115 | 5/1958 | Clarke et al. | 60/39.65 |
| 2,996,884 | 2/1960 | Johnson et al. | |
| 3,020,717 | 2/1962 | Pearce | |
| 3,032,990 | 5/1962 | Rogers | 60/39.32 |
| 3,587,231 | 6/1971 | Fisher et al. | 60/39.28 |
| 3,714,778 | 2/1973 | Howald | |
| 3,720,058 | 3/1973 | Collinson et al. | |
| 3,724,207 | 4/1973 | Johnson | |
| 3,910,035 | 10/1975 | Juhasz et al. | |
| 3,915,387 | 10/1975 | Caruel et al. | |
| 3,943,705 | 3/1976 | DeCorso et al. | 60/39.74 R |
| 3,980,233 | 9/1976 | Simmons et al. | 239/400 |
| 4,027,473 | 3/1976 | Baker | 60/39.28 |
| 4,092,826 | 6/1978 | Pask | 60/39.74 |
| 4,100,733 | 7/1978 | Striebel et al. | |
| 4,107,918 | 8/1978 | Andrew et al. | |
| 4,180,972 | 1/1980 | Herman et al. | 60/39.32 |
| 4,194,358 | 3/1980 | Stenger | 60/39.06 |
| 4,302,932 | 12/1981 | Kuznetsov et al. | 60/39.32 |
| 4,373,342 | 2/1983 | Willis et al. | 60/748 |
| 4,455,840 | 6/1984 | Matt et al. | 60/737 |
| 4,603,548 | 8/1986 | Ishibashi et al. | 60/39.06 |
| 4,683,715 | 8/1987 | Iizuka et al. | 60/39.06 |
| 4,716,719 | 1/1988 | Takahashi et al. | 60/39.06 |
| 4,817,389 | 4/1989 | Holladay et al. | 60/739 |
| 4,897,994 | 2/1990 | Shekleton | 60/39.06 |
| 4,903,478 | 2/1990 | Seto et al. | 60/39.281 |
| 4,918,926 | 4/1990 | Nikkanen | 60/751 |
| 4,991,398 | 2/1991 | Clark et al. | 60/748 |
| 4,993,221 | 2/1991 | Idelchik | 60/39.03 |
| 5,016,443 | 5/1991 | Shimizu et al. | 60/737 |
| 5,020,329 | 6/1991 | Eckstedt et al. | |
| 5,024,055 | 6/1991 | Sato et al. | 60/39.27 |
| 5,077,967 | 1/1992 | Widener et al. | 60/39.02 |
| 5,099,644 | 3/1992 | Sabla et al. | 60/267 |

OTHER PUBLICATIONS

GE Component Test Program to Reduce Risk in F414 Engine Development, Aviation Week and Space Technology Jun. 29, 1992, pp. 64–65.

Engine Testing of a Prototype Low NOx Gas Turbine Combustor Presented at the International Gas Turbine and Aeroengine Congress and Exposition, Cologne, Germany, Jun. 1–4, 1992.

Progress in $NO_x$ and CO Emission Reduction of Gas Turbines: ASME Transactions Oct. 21–25, 1990 pp. 1–7.

Second Generation Low-Emission Combustors for ABB Gas Turbines: ASME Transactions Jun. 11–14 1990 pp. 1–9.

*Primary Examiner*—Louis J. Casaregola
*Attorney, Agent, or Firm*—Bernard E. Shay; Jerome C. Squillaro

[57] ABSTRACT

In a gas turbine engine, combustor flame temperature is maintained within predetermined limits by increasing the combustor airflow during periods of increasing fuel flow and by increasing the burner area when the airflow has reached an upper limit. Increases in burner area are countered by decreasing airflow until the airflow reaches a lower limit, at which time the procedure repeats itself. When the fuel flow is decreased, the airflow is reduced until it reaches its lower limit, at which time the burner area is decreased, allowing the airflow to rise to its upper limit, at which time, the procedure repeats itself.

5 Claims, 5 Drawing Sheets

FUEL SUPPLY CONTROL METHOD FOR A GAS TURBINE ENGINE

The following commonly assigned applications are directed to related subject matter and are being concurrently filed with the present application, the disclosures of which are hereby incorporated herein by reference.

The following commonly assigned application Ser. No. 976,864, filed Nov. 16, 1992, is directed to related subject matter and is being concurrently filed with the present application, the disclosures of which is hereby incorporated herein by reference.

The present invention relates, in general to a novel fuel supply control system for gas turbine engines and more particularly to a novel fuel supply control system which reduces Nitrous-Oxides ($NO_x$).

BACKGROUND OF THE INVENTION

In a gas turbine engine, air is compressed and combined with a fuel (liquid or gaseous) in a combustion chamber. The air fuel mass mixture is ignited and the energy from the resulting expansion is used to turn a turbine. In such engines, the output power is proportional to fuel flow and, more particularly, is proportional to the sum of the fuel mass flow rate and the air mass flow rate through the combustor.

As a byproduct of the combustion process, gas turbine engines, such as those used to power electrical generators, may emit certain pollutants, such as nitrous oxides ($NO_x$). $NO_x$ may be limited by controlling the flame temperature of the burners in the combustor. As the flame temperature is increased, the $NO_x$ produced by the engine also increases. Further, if the flame temperature becomes too high, it may damage the combustor or other parts of the engine. In contrast, if the flame temperature becomes too low, the burners may be extinguished, resulting in a "lean blow out". It would, therefore, be advantageous to maintain the flame temperature within a predetermined range to ensure that the $NO_x$ output is limited and that the combustor does not "blow out" or damage the engine.

Combustor flame temperature in a gas turbine engine is proportional to the fuel to air ratio in the combustor. Flame temperature, being proportional to the fuel to air ratio, increases as the fuel to air ratio increases. Therefore, an increase in fuel flow or decrease in airflow through the combustor will normally result in an increase in flame temperature. In contrast, any decrease in fuel flow or increase in airflow will reduce the flame temperature.

It would, therefore, be advantageous to maintain a substantially constant flame temperature by adjusting the fuel to air ratio within the combustor. For example, the airflow to the combustor might be increased as the fuel flow increases to meet increased output power demands. Alternatively the airflow may be decreased as the fuel flow is decreased for reduced output power demand. However, in many gas turbine engines, the airflow is not adjustable over a sufficient range to maintain a substantially constant flame temperature. Therefore, it may be necessary to use other controllable parameters of the engine, such as the burner area, to control the fuel to air ratio.

SUMMARY OF THE INVENTION

In a gas turbine engine, combustor flame temperature is maintained within predetermined limits by increasing the combustor airflow during periods of increasing fuel flow and by increasing the burner area when the airflow has reached an upper limit. Increases in burner area are countered by decreasing airflow until the airflow reaches a lower limit, at which time the procedure repeats itself. When the fuel flow is decreased, the airflow is reduced until it reaches its lower limit, at which time the burner area is decreased, allowing the airflow to rise to its upper limit, at which time, the procedure repeats itself.

In a gas turbine engine, according to the present invention, a center annulus of pilot fuel nozzles is surrounded by an inner annulus of main fuel nozzles and an outer annulus of main fuel nozzles in concentric rings. The pilot fuel nozzles are connected in parallel to a primary fuel valve while each of the main fuel nozzles are connected individually or in combination to independent staging valves. Control of burner area, and thus, combustor flame temperature may be accomplished by selectively controlling fuel flow to the fuel nozzles. Once the pilot nozzles are ignited, the airflow through the combustor is adjusted to maintain the fuel to air ratio and, thus the flame temperature, within predetermined limits. Once the combustor air flow reaches a predetermined upper or lower limit, the burner area is adjusted to prevent the flame temperature from departing from the predetermined range. The burner area may be adjusted by opening or closing the independent staging valves in a predetermined sequence.

Further, in accordance with the present invention, as the fuel flow is increased or decreased, the flame temperature is held within the predetermined range by stepping the burner pattern through predetermined sequences.

BRIEF DESCRIPTION OF THE DRAWINGS

The novel features of the invention are set forth with particularity in the appended claims. The invention itself, however, both as to organization and method of operation, together with further objects and advantages thereof, may best be understood by reference to the following description taken in conjunction with the accompanying drawings in which:

DETAILED DESCRIPTION OF THE INVENTION

Figure 1:
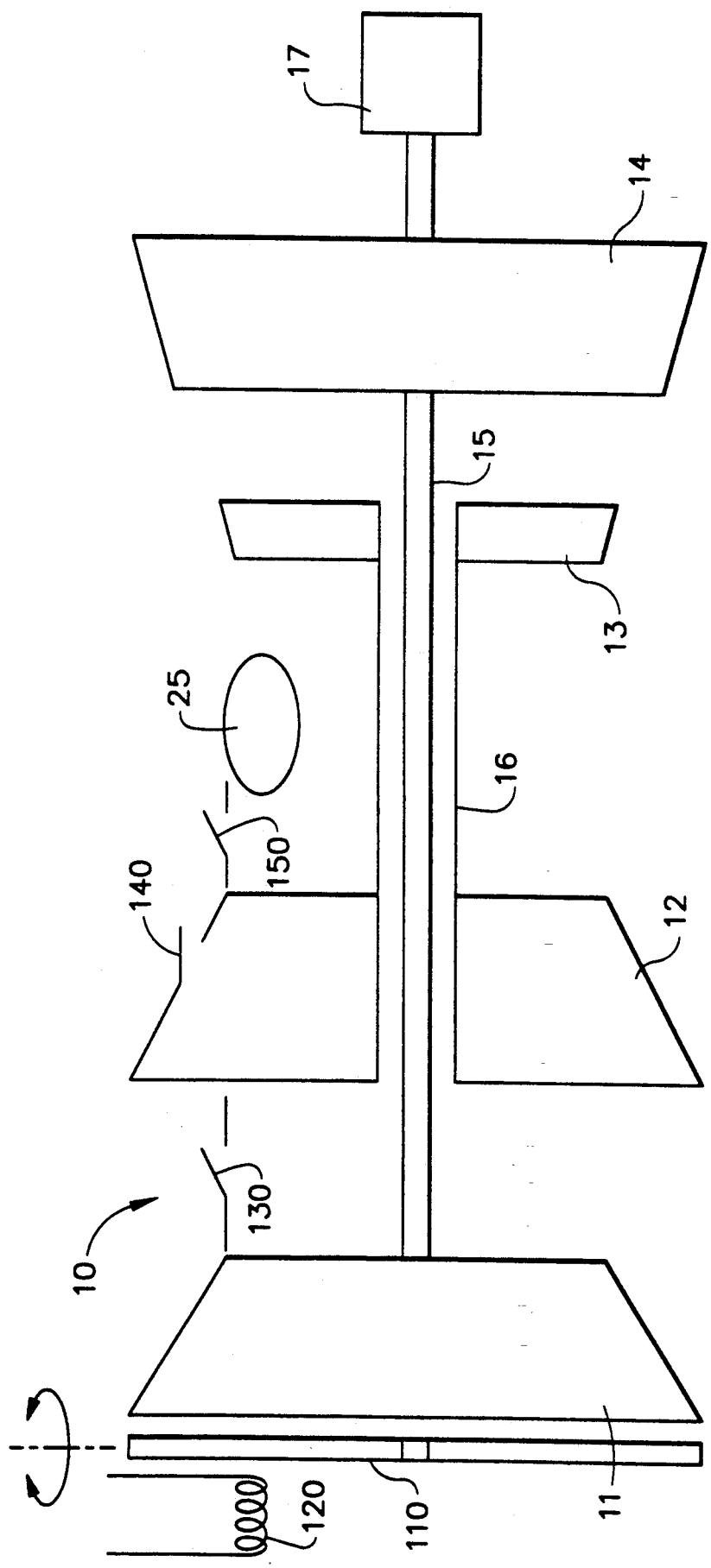
FIG. 1 is a cross section of a gas turbine engine according to the present invention.

Referring now to the drawings in detail, wherein identical numerals indicate the same elements throughout the figures. FIG. 1 depicts a gas turbine engine 10 of the type having a low pressure compressor 11, a high pressure compressor 12 downstream of low pressure compressor 11, a combustor 25 downstream of high pressure compressor 12, a high pressure turbine 13 downstream of combustor 25, and a low pressure turbine 14 downstream of high pressure turbine 13. The standard configuration for engines of this type is a dual concentric shafting arrangement, whereby low pressure turbine 14 is drivingly connected to low pressure compressor 11 by a first shaft 15 and high pressure turbine 13 is similarly drivingly connected to high pressure compressor 12 by a second shaft 16 external and concentric to shaft 15. In the gas turbine depicted in FIG. 1, low pressure turbine 14 is connected directly to low pressure compressor 11 and a load 17. An example of such an engine is manufactured by General Electric Company of Evendale, Ohio under the designation LM6000. While the combustor of the present invention is described as being utilized with the gas turbine engine of FIG. 1, it will be understood that it can also be utilized in gas turbine engines of other configurations.

In one embodiment of the invention, the gas turbine engine of FIG. 1 will include mechanisms and apparatus adapted to control the flow of air through the engine. In FIG. 1, inlet guide vanes 110 are rotatable to limit air flow to low pressure compressor 11. Inlet air heater 120 may be used to change the temperature of the inlet air. Variable bleed valve 130 may be used to bleed air flow between low pressure compressor 11 and high pressure compressor 12. Eighth stage bleed valve 140 may be used to bleed air from the eight stage of compressor 12. Compressor discharge bleed valve 150 may be used to bleed air between the high pressure compressor and combustor 25.

Figure 2:
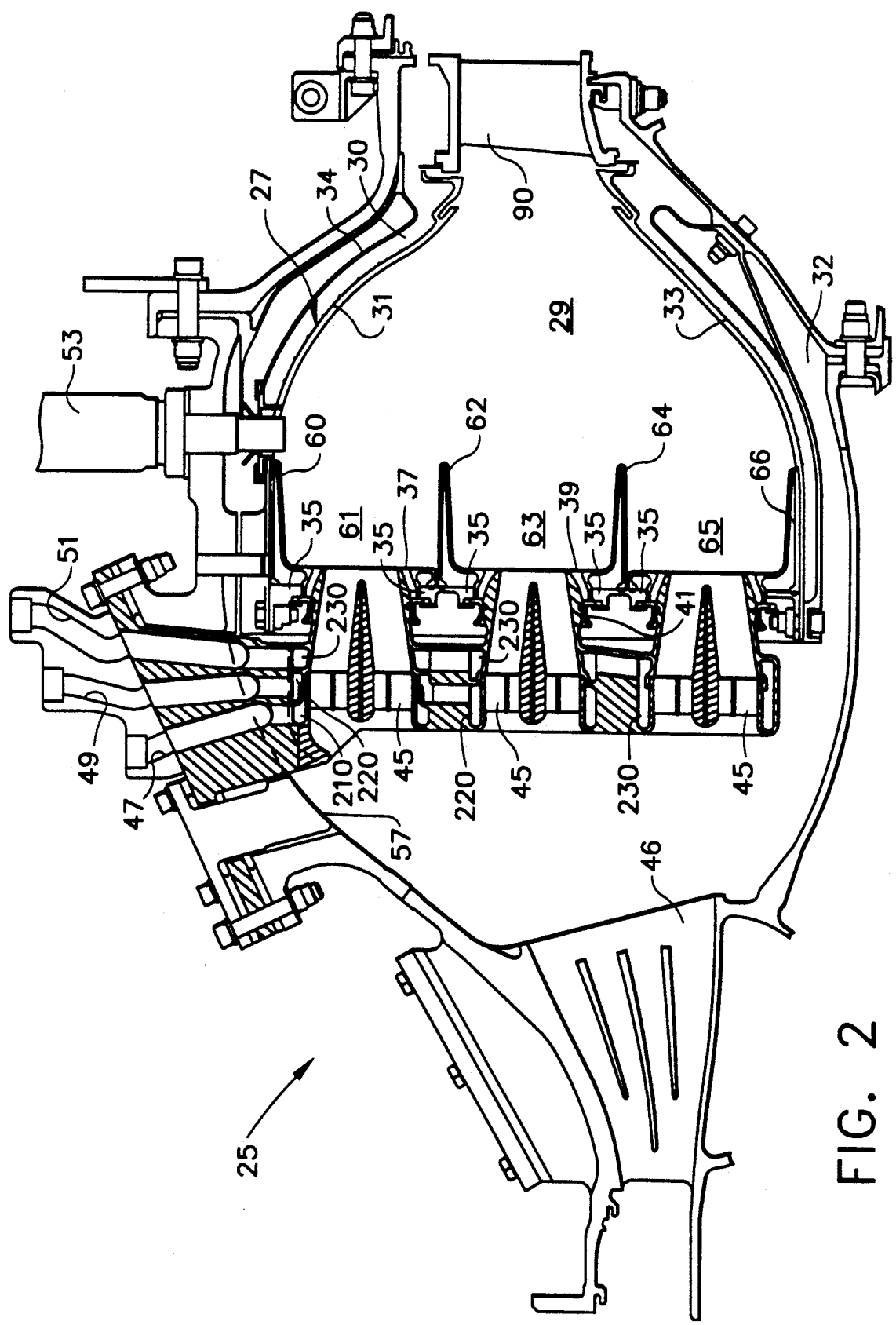
FIG. 2 is a side view cross section of a portion of a combustor according to the present invention.

FIG. 2 depicts combustor 25 according to the present invention which comprises a hollow body 27 defining a combustion chamber 29 therein. Hollow body 27 is generally annular in form and is comprised of an outer liner 31, an inner liner 33, and a dome plate 35. In the present annular configuration, the dome plate 35 of hollow body 27 includes three separate radial annuli (also referred to as "rings")—outer annulus 37, middle annulus 39, and inner annulus 41.

Combustor 25 incorporates a dome and fuel technique which utilizes the lean premix concept during all stages of combustor operation. By "lean premix," it is meant that the fuel/air mixture contains more air than is required to fully combust the fuel, or an equivalence ratio of less than one. It has been found that an equivalence ratio of 0.4 to 0.7 is preferred. This is done by utilizing approximately 80-90% of the total combustion air, which is that supplied by diffuser 46, to provide low fuel to air ratios (even at maximum power where the fuel flow rate is very high). In order to accommodate this high percentage of dome air flow, a large number of swirl cups or premixers are required. Thus, the three domes or annuli 37, 39, and 41 are provided in the triple annular configuration as shown. It is noted that annuli such as 37, 39 and 41 are often referred to as "domes".

Fuel-air mixers 45 are mounted in the openings in dome 35 which are arranged to form annuli 37, 39 and 41. In order to operate combustor 25 during the various stages of engine operation while maintaining a lean premixture of fuel and air, the mixers 45 of the various annuli may be staged (either circumferentially, radially, or a combination of circumferential and radial staging) so that only some are supplied fuel at any given time. The middle annulus 39 is the so-called pilot annulus. Mixers 45 therein will be supplied with fuel during all phases of operation of combustor 25. Thereafter, the mixers of outer annulus 37 and inner annulus 41 will have fuel supplied thereto as required by the power requirements of the gas turbine engine.

Heat shields are provided to segregate the individual annuli. Specifically, outer annulus 37 includes heat shield 60 to help insulate outer liner 31. Middle annulus 39 includes heat shields 62 and 64 to segregate it from outer annulus 37 and inner annulus 41, respectively. Inner annulus 41 includes heat shield 66 in order to insulate inner liner 33 from flames burning therein. In order to accommodate heat shield 60, igniter 53 preferably is located immediately downstream therefrom.

It should be noted that inner liner 33 and outer liner 31 are unitary in construction and do not have nuggets or other cooling holes therethrough. In this way, less cooling air is required in outer passages 30 and inner passage 32. A baffle 34 is provided in outer passage 30 in order to assist in the flow of cooling air therethrough to turbine nozzle 90.

In the embodiment of FIG. 2, Fuel is injected into the air stream at the trailing edge of the mixer 45 through small holes in hollow counter-rotating vanes. Fuel mixes with air, then exits the fuel nozzle, or pre-mixer, into combustion zones 61, 63 and 65 then ignites and burns at a controlled local fuel to air ratio. Fuel is supplied to each mixer through nozzle feeder tubes 47, 49 and 51 which supply fuel to mixers 40 through nozzle plenums 210, 220 and 230 respectively.

For the purposes of the remainder of this discussion, an air fuel mixer in combination with its fuel supply mechanism will be referred to as a fuel nozzle. For example, in the embodiment of FIG. 2 fuel mixer 45 in annulus 37 would comprise an outer nozzle.

Figure 3:
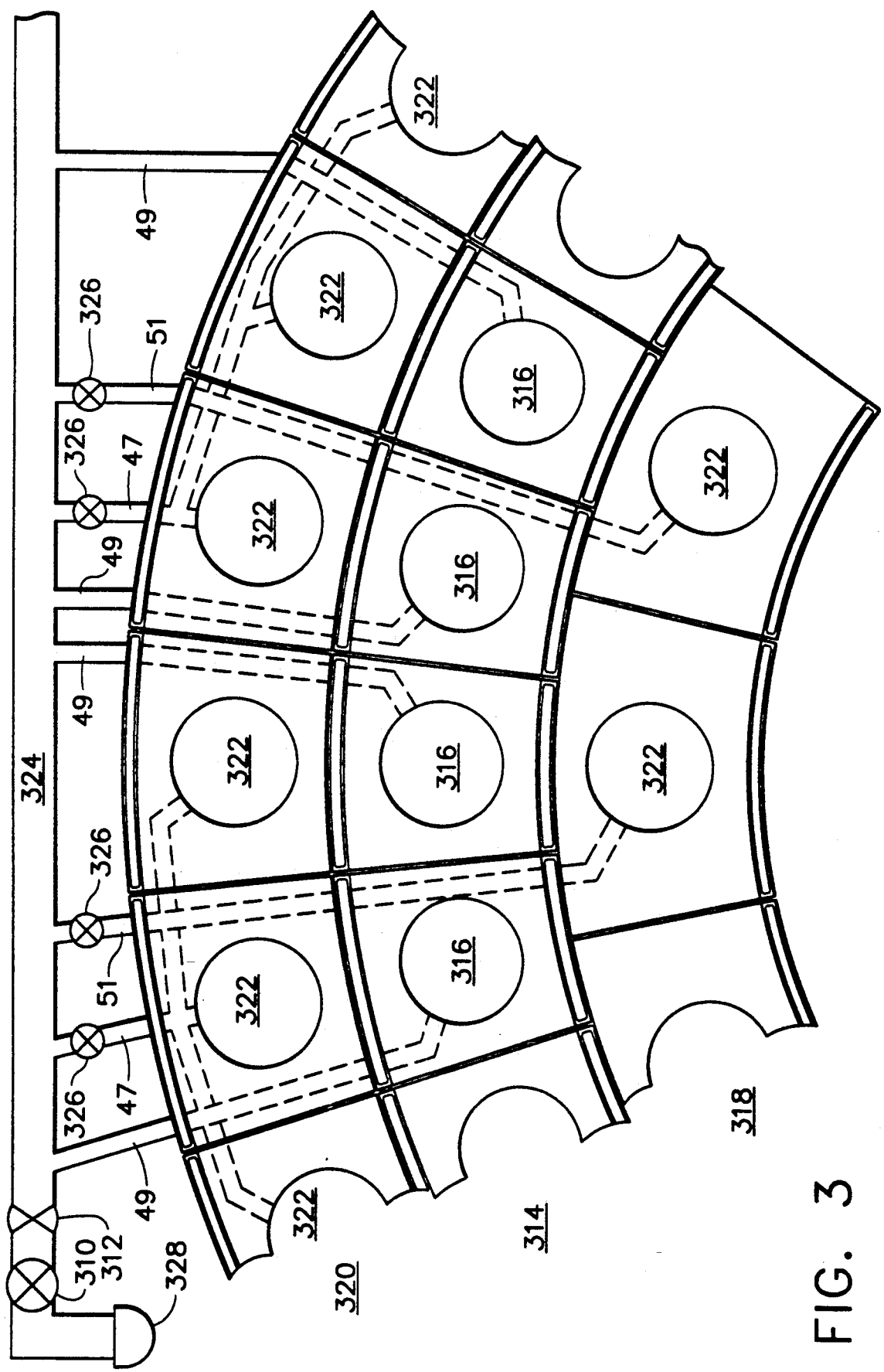
FIG. 3 is an end view schematic cross section of a combustor according to the present invention.

In an annular combustor, fuel nozzles are arranged around the gas turbine in annuli. In a dual annular combustor there are two such annuli and three annuli in a triple annular combustor. FIG. 3 is a schematic representation illustrating the flow of fuel to individual fuel nozzles. In the embodiment of the present invention, illustrated in FIG. 3, the combustor comprises a triple annular combustor including a central annulus 314 of pilot nozzles 316 and an inner 318 and outer 320 annulus of main nozzles 322. In the embodiment of FIG. 3, pilot nozzles 316 are connected directly to fuel manifold 324 through feeder tubes 49. Fuel flow to fuel manifold 324 may be regulated by primary fuel metering valve 310 in combination with primary fuel shutoff valve 312 which receives fuel from fuel source 328 (e.g., a fuel pump and fuel tank). When primary fuel shutoff valve 312 is turned on, the flow rate of fuel to the pilot nozzles is controlled by primary fuel metering valve 310. In this embodiment, the inner and outer main fuel nozzles 322 are connected to the fuel manifold through individual fuel staging valves 326 and feeder tubes 47 and 51. Fuel staging valves 326 are individually addressable and may be turned on or off (i.e., opened or closed) individually or in groups. By turning main nozzles 322 on or off, the total burner area may be adjusted to change the fuel to air ratio in the combustor. In order to ensure that the total burner area is accurately controlled, nozzles 322 are normally turned on or off in predetermined groupings referred to herein as patterns.

It may be advantageous to use one fuel staging valve 326 to control a plurality of main nozzles. Where the number of main nozzles on the outer annulus exceeds the number of main nozzles on the inner annulus, as, for example, in the embodiment of FIG. 3, it may be advantageous to control a plurality (e.g., three) of the main nozzles on the outer annulus using a single fuel staging valve 326.

In FIG. 3 when the combustor is ignited by turning on primary fuel shutoff valve 312 and opening primary fuel metering valve 310, pilot nozzles are connected directly to the fuel manifold 324 and, therefore, in the embodiment described herein, all of the nozzles in the central annulus 314 of the combustor are ignited immediately. When any of the nozzles in the combustor are ignited, the area of the active nozzles may be referred to as the nozzle area.

As fuel flow is increased by, for example, opening primary fuel metering valve 310, it is advantageous to increase the burner area (decreasing the fuel to air ratio in the combustor) since reducing the fuel to air ratio helps to reduce the $NO_x$ content of the engine exhaust. Burner area may be increased by, for example, turning on (i.e., igniting) one or more of main fuel nozzles 322. In one embodiment of the present invention, main fuel nozzles 322 on inner annulus 318 are ignited in predetermined patterns as the fuel flow is increased. Once all the main fuel nozzles on inner annulus 318 are ignited, main nozzles 322 on outer ring 320 may be selectively ignited in predetermined patterns. The inner and outer main fuel nozzles 322 are selectively ignited by selectively opening and closing fuel staging valves 322.

Figure 4:
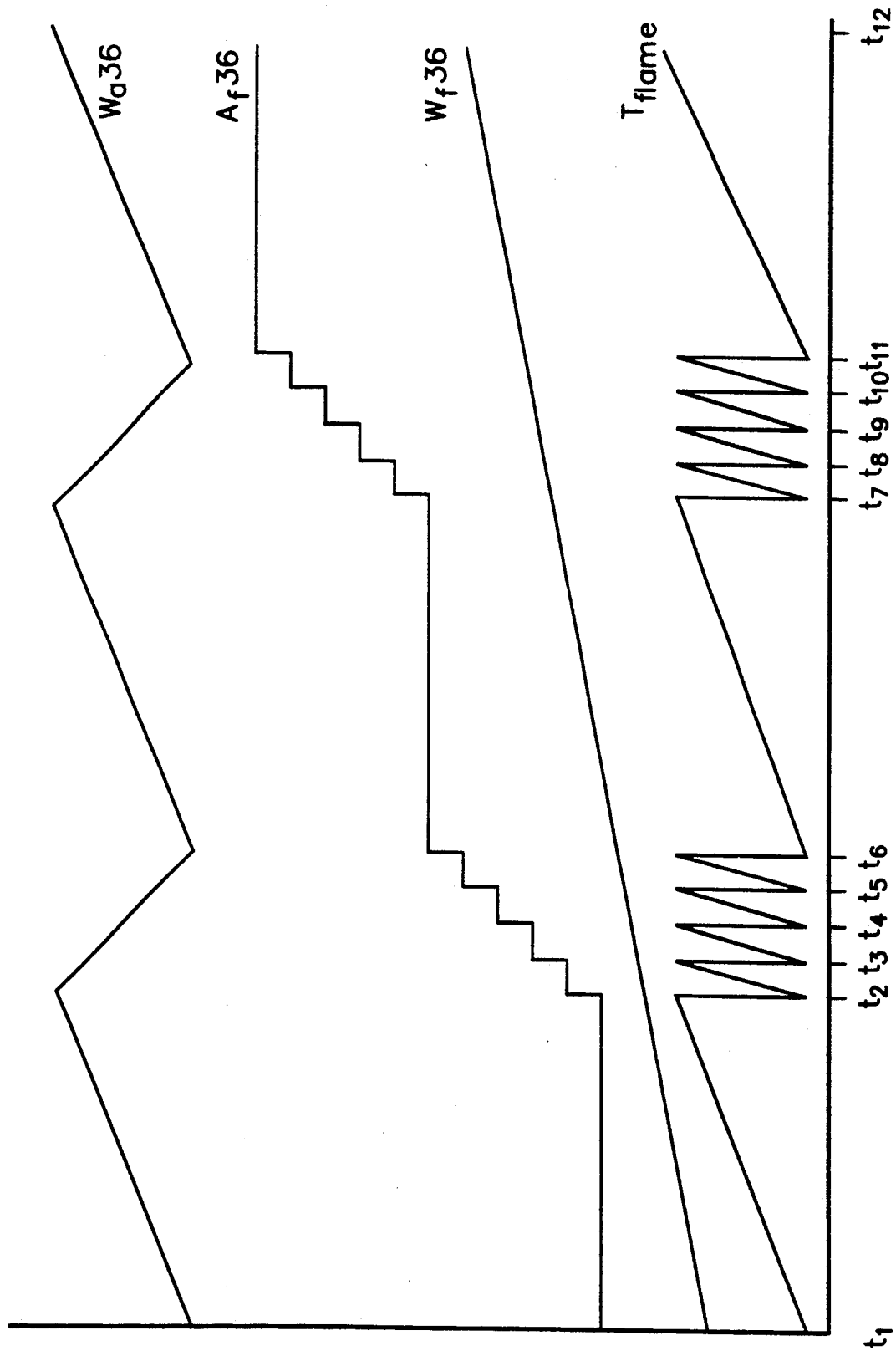
FIG. 4 is an illustration of the relationship between the combustor air flow, burner area, fuel flow and combustor flame temperature for one embodiment of the present invention.

FIG. 4 is a graphical illustration of the relationship between combustor air flow, burner area, total fuel flow and average flame temperature according the present invention.

In a gas turbine engine according to the present invention, it is not always easy to measure engine parameters directly and it may, therefore, be advantageous to use measurable engine parameters as feedback signals representative of engine parameters which are not readily measurable. For example, combustor airflow is difficult to measure, therefore, it is conventional to measure combustor inlet pressure and use the combustor inlet pressure signal as a measurement of combustor airflow. Therefore, those skilled in the art will recognize that discussion of combustor airflow herein will be applicable to combustor inlet pressure.

In FIG. 4, engine parameters are plotted over a time period $t_1$ to $t_{12}$. The line labeled $W_a36$ is a plot representative of combustor airflow. The line labeled $A_f36$ is a plot representative of burner area in the combustor, that is, a plot of the area of the combustor including fuel nozzles which have been ignited. The line labeled $W_f36$ is a plot representative of the fuel flow to the combustor. And $T_{flame}$ is a plot representative of the average combustor flame temperature.

A variable geometry gas turbine engine is an engine in which the geometry (i.e., physical arrangement) of the engine may be changed, as, for example, by adjusting the inlet guide vanes to increase or reduce combustor airflow. In addition, airflow through the combustor is a function of combustor inlet pressure. In a variable geometry gas turbine engine, the pressure at the combustor inlet and, thus, the combustor airflow, may be adjusted using techniques well known to those of skill in the art either directly or by controlling a number of other engine parameters, including, in an embodiment of the present invention, the position of the inlet guide vanes (IGV), the position of the variable bleed valve (VBV), the position of the eighth stage bleed valve ($8^{th}$), the position of the compressor discharge bleed valve (CDP), the total fuel flow ($W_f36$), and the inlet air temperature ($T_2$). In one embodiment of the invention, the inlet may be heated to maintain the inlet air temperature within a predetermined range. It is known that heating the inlet air reduces air density, which increases the fuel to air ratio in the combustor.

Combustor inlet pressure is not, however, variable over an unlimited range. Physical, mechanical and/or operational considerations may place upper and lower limits on combustor airflow. Therefore, combustor airflow may be changed to adjust the fuel to air ratio and control $T_{flame}$, as long as the necessary changes are within the range of $W_a36$. Once combustor airflow reaches the limit of its operating range, the fuel to air ratio may be controlled by changing the burner area by, for example, igniting or extinguishing fuel nozzles in the combustor.

When the combustor is ignited, the pilot nozzles are ignited first, therefore, in the embodiment described herein, all of nozzles in the central annulus of the combustor are ignited. When any of the nozzles in the combustor are ignited, the area of the active nozzles may be referred to as the nozzle area and designated as $A_f36$ in FIGS. 4 and 5. Once the pilot nozzles are lit, $A_f36$ is increased (or decreased) by turning the main nozzles on (or off) in predetermined patterns, changing the fuel to air ratio in the combustor.

It is desirable to adjust the fuel to air ratio by adjusting the combustor airflow since combustor airflow is controllable over a substantially continuous range and, thus, it is possible to continuously compensate for changes in fuel flow. Therefore, it is advantageous to change the burner area when the fuel to air ratio required to maintain flame temperature cannot be achieved by adjustment of the combustor airflow. Changing the nozzle area is advantageous because it holds the fuel to air ratio within the desirable range. However, by its nature, changes in nozzle area must be made in steps, making it difficult to achieve continuous control of flame temperature. Therefore, nozzle area changes, change the relationship between fuel and air such that the combustor airflow may be adjusted and used to control the fuel to air ratio again.

The following discussion of FIG. 4 assumes a steadily increasing fuel flow ($W_f36$) and a combustor including 5 inner nozzles, 5 outer nozzles and 5 pilot nozzles wherein each of the inner and outer nozzles is controlled directly through an associated staging valve. As illustrated in FIG. 4, prior to time $t_1$, the pilot nozzles have been ignited and $A_f36$ has increased from zero to some minimum value. In the time interval $t_1$ to $t_2$ fuel flow $W_f36$ continues to increase. The flame temperature $T_{flame}$ also increases during this period, reflecting the increase in fuel to air ratio in the combustor. In addition, prior to $t_1$, combustor airflow ($W_a36$) is increased to partially compensate for the increase in fuel flow (fuel flow increases faster than airflow for the engine cycle conditions of FIGS. 4 and 5), resulting in the increase in flame temperature. Once the combustor airflow reaches an upper limit (e.g., the upper limit of its range) increases in flame temperature $T_{flame}$ must be limited by means other than further increases in combustor airflow. Therefore, according to the present invention, the burner area is increased, by, for example, igniting selected main nozzles to substantially decrease the local fuel to air ratio, allowing the combustor airflow to be decreased. Increasing the burner area decreases the local fuel to air ratio in the combustor and, therefore, decreases $T_{flame}$. Combustor airflow is decreased by, for example opening the variable bleed valves. As FIG. 4 illustrates, at time $t_2$, burner area $A_f36$ increases, decreasing $T_{flame}$. During the period $t_2$–$t_3$, $W_a36$ is decreased, increasing $T_{flame}$.

The drop in flame temperature (e.g., at $t_2$) may be limited by controlling the increase in burner area. Therefore, to prevent flame temperature from dropping below a predetermined minimum value ($T_{min}$), the burner area is increased in steps. During the period $t_2$–$t_6$, combustor airflow is reduced to a lower limit (e.g., the lower limit of its range) while the burner area $A_f36$ is increased incrementally to compensate for the reductions in combustor inlet pressure and the increased fuel flow $W_f36$. Thus, during the period $t_2$–$t_6$, the combustor fuel to air ratio and, therefore, the combustor flame temperature fluctuates within the predetermined range.

Once the combustor airflow has been reduced to, for example, its minimum value, it may be adjusted to change the fuel to air ratio directly, as for example, during the period $t_6$–$t_7$, until the combustor inlet pressure reaches its upper limit.

Burner area is adjusted by changing the nozzle pattern (i.e. by turning selected main nozzle's on or off). In the embodiment of the present invention discussed previously, a single inner nozzle is turned on at time $t_2$ to provide a predetermined increase in $A_f36$. Between time $t_2$ and time $t_3$, flame temperature increases from the predetermined lower limit to the predetermined upper limit of its range while $W_f36$ increases and combustor airflow $W_a36$ is decreased. When flame temperature reaches its predetermined upper limit, at time $t_3$, $A_f36$ is increased again by turning on a second inner nozzle, reducing $T_{flame}$ to $T_{min}$.

The preceding sequence is repeated at times $t_4$, $t_5$ and $t_6$, or until all five of the nozzles on the inner annulus are lit. At $T_6$, all of the inner and center (pilot) nozzles are lit and $W_a36$ has simultaneously reached its minimum value. During the period $t_6$ to $t_7$ increases in combustor airflow substantially compensate for the increase in fuel flow, holding the flame temperature within its optimum range. Once the combustor airflow reaches its maximum value at time $t_7$, $T_{flame}$ is adjusted by turning on individual outer main nozzles on the outer annulus in step intervals (as described above) during time $t_7$ to $t_{11}$.

The preceding description is presented as an example of one embodiment of the present invention. Another embodiment of the present invention might, for example, turn on only ½ the nozzles in the inner annulus from $t_2$ to $t_6$. In this embodiment, static component temperature could be kept constant around the combustor from $t_6$ to $t_7$ by rotating the pattern circumferentially around the combustor. In further embodiments of the invention, a number of step periods (e.g. $t_2$ to $t_6$) could be used to move through periods where the combustor airflow could not, for whatever reason, be used to control the combustor fuel to air ratio and, thus the flame temperature.

Figure 5:
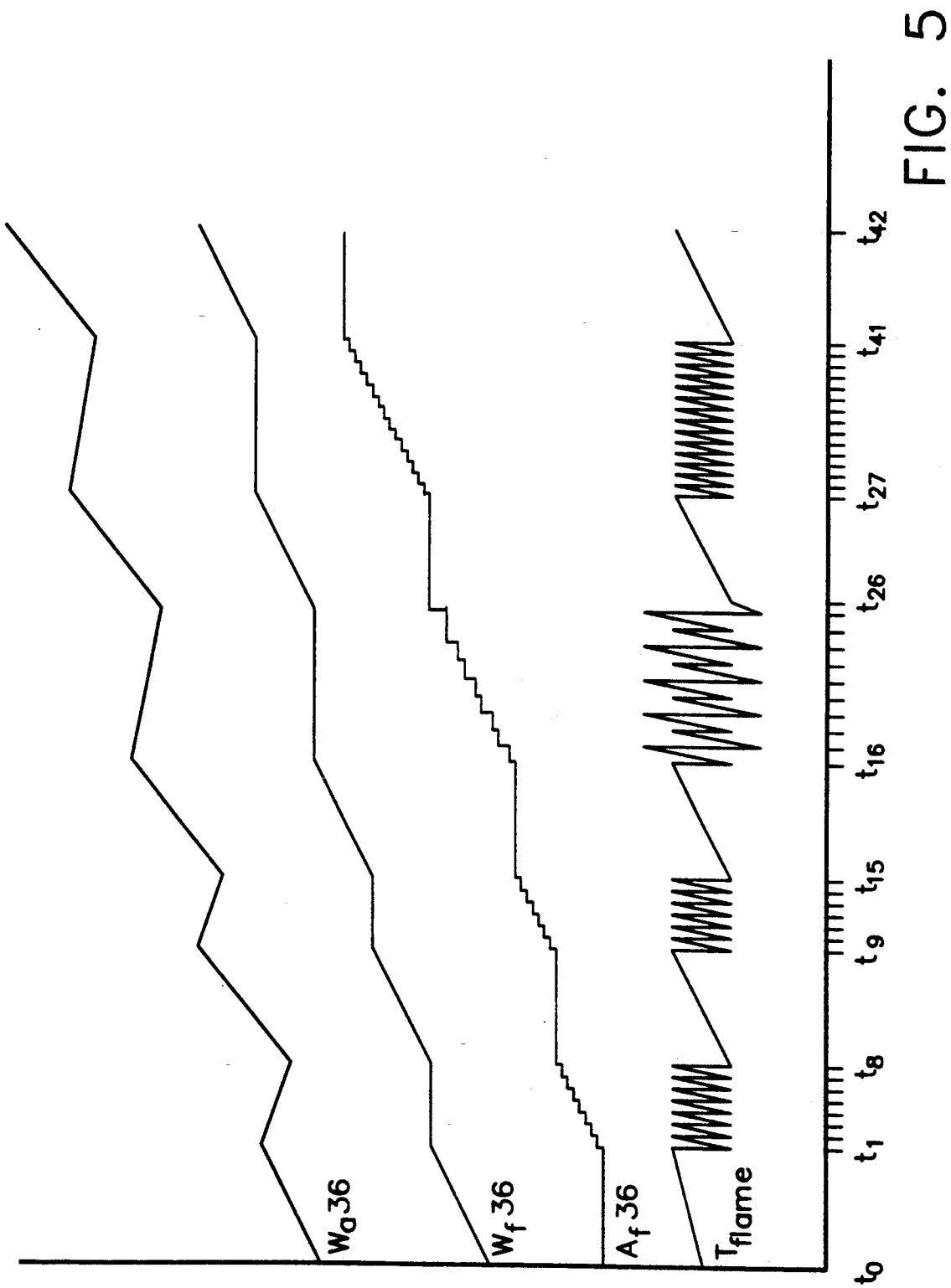
FIG. 5 is an illustration of the relationship between flame temperature and burner area for a further embodiment of the present invention.

In the embodiment of the invention illustrated in FIG. 5, a triple annular combustor including 15 inner, 30 pilot and 30 outer nozzles is controled in a manner simmilar to the manner described previously. At time $t_0$, the primary valve is open and the pilot nozzles are ignited. As the flame temperature reaches a predetermined value at $t_1$, the fuel staging valves for the inner nozzles are turned on selectively to supply fuel to those nozzles. While each staging valve may control a plurality of nozzles, in the present embodiment, each inner nozzle is controlled by an individual staging valve as illustrated in FIG. 3.

At $t_1$ one inner staging valve is opened, igniting one inner nozzle. In the interval $t_1$–$t_8$, one-half of the inner nozzles are ignited while the combustor airflow $W_a36$ is minimized. In the interval, $t_8$–$t_9$, the fuel to air ratio in the combustor is controlled by the airflow through the combustor which is increased to its maximum value at $t_9$. In the interval, $t_9$–$t_{15}$, the remaining inner nozzles are ignited while the combustor airflow $W_a36$ is returned to a minimum value. In the interval, $t_{15}$–$t_{16}$ the fuel to air ratio in the combustor is controlled by adjusting the airflow through the combustor, which increases to its maximum value at $t_{16}$. At $t_{16}$ two inner staging valves are turned off and one outer staging valve is turned on, extinguishing two inner nozzles and igniting 3 outer nozzles. At time $t_{18}$ one inner staging valve is turned off and one outer staging valve is turned on, extinguishing one inner nozzle and igniting 3 outer nozzles. This process is repeated 10 times until all of the outer nozzles are turned on and all of the inner nozzles are turned off at time $t_{26}$. It will be noted that the change in nozzle area $A_f36$ FIG. 5 reflects the number of nozzles lit and extinguished at each period.

Therefore, between time $t_1$ and time $t_8$, one half of the inner staging valves are opened and the associated nozzles are ignited. Between time $t_8$ and $t_9$ the pattern is rotated circumferentially to maintain the average static temperature around the combustor. Between $t_9$ and $t_{15}$ the other half of the inner nozzles are ignited selectively. During the period from $t_{16}$ to $t_{26}$, the outter nozzles are ignited as the inner nozzles are extinguished. Since the nozzles are not ignited and extinguished on a one-for-one basis, the changes result in a larger range of flame temperature. For example, at $t_{16}$, the temperature excursion is less than the temperature excursion at $t_{17}$ because the change in nozzle area ($A_f36$) at $t_{17}$ is larger than the change at $t_{16}$. At $t_{17}$ three outer nozzles are ignited for one inner nozzle extinguished where, at $t_{16}$, three outer nozzles are ignited for two inner nozzles extinguished. At $t_{26}$, all of the external nozzles have been ignited and all of the internal nozzles have been extinguished. From $t_{27}$ to $t_{41}$, the inner nozzles are re-ignited.

As previously discussed, by holding the flame temperature within a predetermined range, the present invention limits the production of $NO_x$. In addition, holding the flame temperature within a predetermined range reduces the possibility of lean blowout or high temperature damage.

While preferred embodiments of the present invention have been shown and described herein, it will be obvious to those skilled in the art that such embodiments are provided by way of example only. Numerous variations, changes, and substitutions will now occur to those skilled in the art without departing from the invention. Accordingly, it is intended that the invention be limited only by the spirit and scope of the appended claims.

We claim:

1. In a gas turbine engine including a triple annular combustor comprising a central ring of pilot fuel nozzles and inner and outer rings of main fuel nozzles, a method of increasing output power by the steps of:
    a) opening said pilot fuel nozzles;
    b) increasing fuel flow to the combustor at a rate sufficient to increase said output power;
    c) measuring average flame temperature;
    d) decreasing local fuel to air ratio to reduce said flame temperature to a predetermined minimum value when said flame temperature reaches a predetermined maximum value;

e) increasing local fuel to air ratio until said flame temperature reaches said predetermined maximum value;

f) repeat steps b through e until said output power reaches a predetermined level.

2. The method of claim 1 wherein:

said step of increasing fuel flow to said combustor comprises opening a main fuel metering valve to said fuel nozzles;

said step of decreasing local fuel to air ratio in said combustor comprises turning on selected ones of said main fuel nozzles;

said step of increasing local fuel to air ratio comprises reducing airflow through said combustor.

3. The method of claim 2 wherein:

said step of reducing airflow through said combustor comprises opening a bleed valve in said gas turbine engine.

4. A method of controlling fuel to air ratio in a gas turbine engine wherein a combustor comprises an inner main ring of fuel nozzles, an outer main ring of fuel nozzles and a central ring of pilot fuel nozzles, said method comprising the steps of:

increasing air flow through said combustor to a flow sufficient to maintain said fuel to air ratio in said combustor within a predetermined range when fuel flow to said combustor is increased;

increasing ignited burner area in said combustor when said air flow reaches a predetermined upper value, wherein said ignited burner area is increased by igniting selected ones of said inner fuel nozzles until all of said inner fuel nozzles are ignited prior to igniting any of said outer fuel nozzles;

decreasing air flow through said combustor to a flow sufficient to maintain said fuel to air ratio within said predetermined range when said fuel flow is decreased; and decreasing said ignited burner area when said air flow reaches a predetermined lower value wherein said ignited burner area is decreased by extinguishing selected ones of said outer fuel nozzles until all of said outer fuel nozzles are extinguished prior to extinguishing any of said inner fuel nozzles.

5. A method according to claim 4 wherein:

said ignited burner area is incrementally increased by igniting selected ones of said inner fuel nozzles until said inner fuel nozzles are ignited prior to igniting any of said outer fuel nozzles;

said ignited burner area is further increased by igniting selected ones of said outer fuel nozzles while extinguishing selected ones of said inner fuel nozzles until all of said outer fuel nozzles are ignited and all of said inner fuel nozzles are extinguished;

said ignited burner area is further increased by igniting selected ones of said inner nozzles until all of said inner, outer and pilot nozzles are ignited.

* * * * *